June 10, 1930.                H. M. HOOD                1,763,522
              HEAD CONSTRUCTION FOR AUTOMOBILE WINDOWS
                         Filed May 29, 1928

INVENTOR
Harry M. Hood
BY
ATTORNEY

Patented June 10, 1930

1,763,522

UNITED STATES PATENT OFFICE

HARRY M. HOOD, OF CHICAGO, ILLINOIS, ASSIGNOR TO FEATHEREDGE RUBBER COMPANY, INC., A CORPORATION OF ILLINOIS

HEAD CONSTRUCTION FOR AUTOMOBILE WINDOWS

Application filed May 29, 1928. Serial No. 281,429.

The present invention relates to sealing strips to be used in the tops of automobile windows including the windows in the doors. In such windows it is customary to have a piece of plate glass move as the sash member. Sometimes the edges are ground and sometimes the edges are surrounded by a thin metal strip. I have discovered that if at the top of the window opening there is inserted a sponge rubber lintel member having a channel formed in its underside to receive the glass or sash, then when the glass or sash is pushed up into place, the top portion will be compressed, and the sides of the channel will be tilted inward and engage the sides of the glass to make a seal.

The lintel member is preferably made of molded sponge rubber so that it will have the usual surface skin, and the channel preferably is formed with a rounded inner face, whereas the glass or sash member is usually relatively flat, with only the corners rounded off. In such a case, as the sash member is pushed up into place, the corners of the sash member sink into the sponge rubber very readily exerting a tension on the skin surface to bend in the sides, even before the top of the channel is reached, so that the seal is perfected even if the face of the channel is not perfectly parallel with the top edge of the glass.

Figure 1:
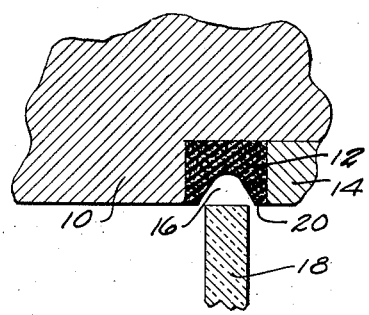
Figure 2:
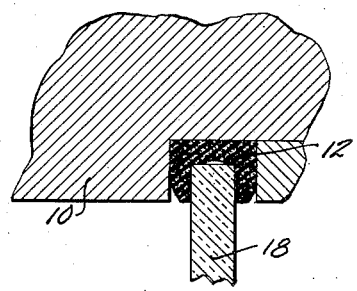
Figure 3:
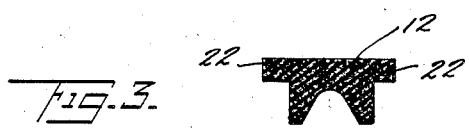

My invention is illustrated in the accompanying drawings, in which Fig. 1 shows a section through the top of a door showing a sponge rubber channel in place embodying my invention; Fig. 2 is a similar view showing the channel after the glass has been pushed up into position, and Fig. 3 shows a section of modified shape intended to be made of sponge rubber which will act similarly to the shapes shown in Figs. 1 and 2. As shown in Fig. 1 the frame member 10 is rabbeted to receive the lintel member 12 which is held in place by molding 14. The lintel member 12 is here illustrated as being rectangular in shape with the approximately circular channel 16 formed in the underside. This groove is preferably slightly wider than the average thickness of the window glass 18 so that relatively narrow legs 20 are left on the sides of the channel 16.

As shown in Fig. 2, when the glass 18 is pushed up in place the corners of the glass 18 will sink into the channel member 12 due to the cellular structure of the sponge rubber. However, as is well known, molded sponge rubber has a skin covering its surface and as the channel member 12 is compressed, the inner skin of the groove 16 will be put under tension due to the distortion of the mass and the legs 20 will be drawn in to press against the faces of the glass 18 forming a joint which is substantially leakproof and which will not rattle.

The channel member 12' illustrated in Fig. 4 is exactly the same as the channel 12 except that it is provided with flanges 22 which are used to hold it in place in the frame.

It is understood that the foregoing are given by way of illustration only and that the same may be modified in many details without departing from the spirit of my invention.

What I claim is:

1. In a window construction for automobiles and the like, a relatively thin sash member and a lintel member comprising sponge rubber having in its lower face a channel of different contour from that of the upper edge of the sash member and a compressible portion above such channel so that when the sash member is forced up into the channel and the top thereof compressed, the side edges of the channel will be tilted in to make a seal against the face of the sash member.

2. A structure as specified in claim 1 in which said lintel member is formed of molded sponge rubber having a surface skin and the channel is curved at the top, and the top of the sash member is relatively flat, so that the edges of the sash member will exert tension on the surface skin of the inside of the channel as the sash member is moved up into place.

3. A header strip for use in automobile windows consisting of a strip of molded rubber having a channel in one face and a readily compressible portion containing air spaces behind such channel so that if a piece of plate glass or the like with an edge of different contour from that of the channel is forced into such channel and the portion behind such channel compressed, the side edges of the channel will be tilted inwards to make a seal against the face of the sash member.

4. In a window construction for automobiles and the like, a relatively thin sash member, a lintel having a recess in its lower face, and a sponge rubber lintel member partly filling such recess so as to form a channel to receive the upper edge of the sash member which channel has a width at its mouth greater than the thickness of the sash member, said sponge rubber member having a side portion which will extend down alongside of the sash member when the latter is in closed position, and an upper compressible portion above the said channel so that when the sash member is forced into the channel and said upper portion of the sponge rubber member is compressed, the said side portion will be tilted in to make a seal against the face of the sash member.

HARRY M. HOOD.